United States Patent Office 3,440,252
Patented Apr. 22, 1969

3,440,252
PREPARATION OF 21-DEOXY STEROIDS
Niall Galbraith Weir, Wembley, Middlesex, England, assignor to Glaxo Laboratories Limited, Greenford, Middlesex, England, a British company
No Drawing. Filed June 21, 1966, Ser. No. 559,083
Int. Cl. C07c 167/00, 169/36
U.S. Cl. 260—397.45                       18 Claims

ABSTRACT OF THE DISCLOSURE

17α - acyloxy - 20 - keto-21-substituted steroids of the pregnane series are converted to 17α-acyloxy-20-keto-21-unsubstituted steroids by heating with a tertiary amine or dialkyl sulfoxide when the 21-substituent is iodine and, if such heating is conducted in the presence of a metal iodide, also when the 21-substituent is bromine or hydrocarbonsulfonyloxy.

---

This invention is concerned with a process for the production of 17-α-monoesters of 17-α-hydroxy-20-keto-steroids of the pregnane series.

Various 17α-monoesters of 17α-hydroxy-20-keto compounds of the pregnane series have useful anti-inflammatory action, especially valuable examples of such compounds being described in our application S.N. 466,434, filed June 23, 1965, now Patent No. 3,376,193. Compounds having anti-inflammatory action will have as is well known, certain substituents in the nucleus, necessary for activity, namely a keto group at the 3-position, a double bond at the 4-position or 1- and 4-positions and either an oxygen function e.g. a hydroxy group at the 11β-position or chlorine at both the 9α- and 11β-positions. Additional substituents enhancing or modifying activity may also be present e.g. a fluorine atom at the 9-position and/or fluorine atoms, methyl and hydroxyl groups etc. e.g. at the 2,6- or 16-positions.

An object of the present invention is to provide a convenient method for the preparation of 17α-monoesters of 17α-hydroxy-20-keto compounds of the pregnane series, particularly compounds having anti-inflammatory action or precursors or intermediates therefor. It is a particular object of the invention to provide a convenient method of producing such 17α-monoesters of compounds having an additional hydroxy group in the nucleus e.g. at the 11-position. Thus attempts to acylate an 11β,17α-dihydroxy 20-keto-pregnane compound at the 17α-position are generally not entirely successful and additional acylation at position 11 frequently occurs.

17α-monoesters of 17α,21-dihydroxy 20-keto steroids can be prepared in comparatively simple manner by first converting the 17α,21-dihydroxy compound to a 17α,21-orthoester which may then be hydrolysed with acid to the 17α-monoester (see U.S. Patent No. 3,152,154). This method of preparation in general gives rise to little risk of acylation of any hydroxy group which may be present at the 11β-position.

The present invention provides a process for the preparation of a 17α-acyloxy steroid of the pregnane series having at position 17 the formula:

(II)

which comprises heating a 21-iodo-17α-acyloxy steroid of the pregnane series having at position 17 the formula:

(III)

where R in Formulae II and III is an alkyl, cycloalkyl, cycloalkylalkyl or aralkyl group, with a tertiary amine or dialkyl sulphoxide.

In a modification of the process according to the invention a pregnane compound having at position 17 the formula:

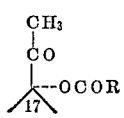
(I)

where X is a hydrocarbon sulphonyloxy radical or a bromine atom and R is an alkyl, cycloalkyl, cycloalkylalkyl or aralkyl group, is heated with a metal iodide e.g. an alkali metal or alkaline earth metal iodide in the presence of a tertiary amine or a dialkyl sulphoxide.

While we do not wish to be limited by theoretical explanations we believe that the modified process proceeds by intermediate formation of the 21-iodo compound.

The group R is preferably a lower alkyl group having from 1 to 7 or more carbon atoms.

The cycloalkyl groups preferably contain 5 or 6 carbon atoms and the cycloalkylalkyl group is preferably a cycloalkylmethyl group.

Examples of tertiary amines which can be used include pyridine, collidine, dimethylaniline and triloweralkylamines e.g. triethylamine or tripropylamine. Examples of dialkyl sulphoxides include the lower alkyl sulphoxides such as dimethyl sulphoxide.

The above reactions may be carried out as necessary in the presence of an additional inert solvent and preferred inert solvents include ketones e.g. acetone and methylethyl ketone, alkanols e.g. ethanol, methanol and isopropanol, and substituted amide solvents e.g. dimethyl formamide.

The hydrocarbon radical of the sulphonyl group may be any convenient alkyl, aryl or alkaryl group e.g. a lower alkyl or loweralkylaryl group especially those where the alkyl moieties contain from 1 to 6 carbon atoms. e.g. methyl or p-tolyl etc.

The conversion of Compound I to Compound II or of Compound III to Compound II is preferably effected by heating at temperatures of from 60° C. to 120° C., if necessary under pressure where the boiling point of the tertiary amine, sulphoxide or solvent is below that of the selected reaction temperature. A convenient reaction temperature is 100° C. or alternatively the boiling point of the tertiary amint, dialkyl sulphoxide or solvent if this is below 100° C.

21-bromo compounds of Formula I may for example, be prepared by reacting the corresponding 21-hydrocarbon sulphonyloxy compounds with an alkali metal or alkaline earth metal bromide such as sodium, lithium or calcium bromide under anhydrous conditions in a solvent e.g. acetone, ethanol, acetonitrile, or dimethyl formamide. This reaction is preferably effected at temperatures of from 50° C. to 120° C., conveniently at the boiling point of the solvent used. Relatively long reaction times are generally necessary which may amount to several days.

The 21-iodo compounds of Formula III may be formed either directly from tthe corresponding 21-hydrocarbon sulphonyloxy compounds or from the corresponding 21-bromo compounds the latter method being preferred to the former. The direct formation of the 21-iodo compound either from the hydrocarbon sulphonyloxy compound, or from the 21-bromo compound is effected by heating with an alkali metal or alkaline earth metal iodide in the presence of a solvent such as acetone, ethanol, acetonitrile or dimethyl formamide. The reaction is preferably carried out at temperatures of from 50° C. to 120° C. conveniently at the boiling point of the solvent used. The conversion of the 21-sulphonyloxy compounds to the 21-iodo compounds is slow, being frequently incomplete even after 8 days. Formation from the bromide is however relatively rapid, reaction times of e.g. 12 hours being frequently sufficient dependent on the reaction temperature employed.

The 21-hydrocarbonsulphonyloxy compounds can be prepared from the corresponding 21-hydroxy compounds in conventional manner e.g. by reaction with a hydrocarbon sulphonyl halide in the presence of a tertiary base e.g. pyridine.

The processes according to the invention are particularly useful for the production of various 17α-monoesters of 21-deoxybetamethasone and 21-deoxydexamethasone, e.g. compounds having the formula:

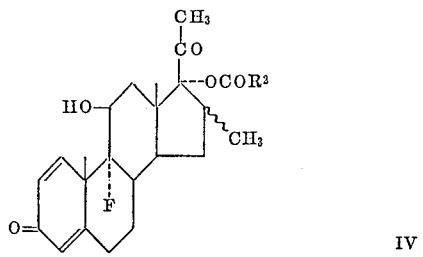

IV (where $R^2$ is a a straight or branched chain alkyl group having from 1 to 9 carbon atoms in particular an alkyl group containing a straight chain of up to three carbon atoms which may be branched with a methyl group) and especially the compounds of our copending application S.N. 466,434, filed June 23, 1965, now Pat. No. 3,376,193.

The processes according to the invention are also useful in the production of $\Delta^9$ pregnane compounds particularly those used as starting materials for the preparation of topically active steroids according to our copending application S.N. 559,067, filed June 21, 1966, now abandoned. These starting materials may thus be prepared by converting a 17α,21-diol to the corresponding 21-ol-17α-acyloxy compound via a 17α,21-orthoester, converting to a 21-hydrocarbonsulphonyloxy compound of Formula I and then proceeding according to a process of the present invention. The $\Delta^9$ starting materials are also useful for conversion to the compounds of IV where $R^2$ has the meaning given above.

The invention will now be illustrated with reference to the following examples in which all temperatures are in degrees centigrade.

EXAMPLE 1

(a) 9α-fluoro-11β-hydroxy-21-methanesulphonyloxy-16β-methyl-17α-propionyloxypregna-1,4-diene-3,20-dione 9α - fluoro - 11β,21 - dihydroxy - 16β - methyl - 17α-propionyloxypregna-1,4-diene-3,20-dione (5.3 g.) in pyridine (20 ml.) was treated with methanesulphonyl chloride (5 ml.) and the mixture was left at room temperature for 15 min. It was then poured into ice-cold N-hydrochloric acid with shirring. The 21-methanesulphonate was filtered off and crystallised from aqueous ethanol, to give 4.5 g. of material, M.P. 177–179°, [α]$_D$+80° (c. 0.5 in CHCl$_3$), λ max. (in EtOH)238–240 mμ (ε 14,800) (found: C, 58.2; H, 7.0. C$_{26}$H$_{35}$FO$_8$ S.½H$_2$O requires C, 58.2; H, 6.8%).

(b) 9α-fluoro-11β-hydroxy-16β-methyl-17α-propionyloxypregna-1,4-diene-3,20-dione 9α-fluoro-11β-hydroxy-21-methanesulphonyloxy - 16β-methyl - 17α - propionyloxypregna-1,4-diene-3,20-dione (1 g.) in pyridine (50 ml.) was treated with soduim iodide (3 g.) and the mixture was heated at 100° for 6 hrs. It was then poured into dilute hydrochloric acid and extracted with chloroform. The extract was washed successively with aqueous sodium bicarbonate, aqueous sodium thiosulphate and water, dried (MgSO$_4$), and evaporated to dryness. The residue was chromatographed on neutral alumina (Grade III; 50 g.); the material eluted by etherbenzene (1:3) was crystallised from acetone-hexane to give 9α-fluoro-11β-hydroxy-16β-methyl-17α-propionyloxypregna - 1,4 - diene - 3,20 - dione (270 mg.) M.P. 238–241°, [α]$_D$+75° (c. 1.0 in CHCl$_3$).

EXAMPLE 2

(a) 9α-fluoro-11β-hydroxy-21-methanesulphonyloxy-16β-methyl-17α-valeryloxypregna-1,4-diene-3,20-dione A solution of 9α-fluoro-11β,21-dihydroxy-16β-methyl-17α-valeryloxypregna-1,4-diene-3,20-dione (2 g.) in pyridine (17.2 ml.) was cooled to 0° and treated with methanesulphonyl chloride (1.72 ml.). After standing for 15 min. at 0° the mixture was poured into iced 0.5 N hydrochloric acid, and the precipitate was collected, and washed with sodium bicarbonate and water. The material was dried in vacuo over potassium hydroxide at room temperature to give the methane-sulphonate (2.25 g.) as an amorphous solid, M.P. ca. 76° dec. [α]$_D$+71.0° (c. 1.3 in dioxan), λ max. (in EtOH) 239 mμ (ε 15,580) (found: C, 60.45; H, 7.4; S, 5.8. C$_{28}$H$_{39}$FO$_8$S requires C, 60.6; H, 7.1; S, 5.8%).

(b) 21-bromo-9α-fluoro-11β-hydroxy-16β-methyl-17α-valeryloxypregna-1,4-diene-3,20-dione A solution of 9α-fluoro-11β-hydroxy-21-methanesulphonyloxy-16β-methyl-17α - valeryloxypregna-1,4-diene-3,20-dione (4 g.) in acetone (200 ml.) was treated with anhydrous lithium bromide (12 g.) and the mixture was refluxed for 3 days. The acetone was removed in vacuo and the residue partitioned between chloroform and water. The chloroform fraction, after evaporation and crystallisation from ether, gave the 21-bromo compound (3.0 g.) as prisms, M.P. 148–149° C. (dec.), [α]$_D$+99.3° (c. 1.6 in dioxan), λ max. (in EtOH) 238–239 mμ (ε 16,620) (found: C, 60.5; H, 6.9; Br, 14.6. C$_{27}$H$_{36}$BrFO$_5$ requires C, 60.1; H, 6.7; Br, 14.8%).

(c) 9α-fluoro-11β-hydroxy-21-iodo-16β-methyl-17α-valeryloxypregna-1,4-diene-3,20-dione (i) A solution of 21-bromo-9α-fluoro-11β-hydroxy-16β - methyl-17α-valeryloxypregna-1,4-diene-3,20-dione (1.66 g.) in acetone (75 ml.) was treated with sodium iodide (3.3 g.) and the mixture refluxed overnight. The acetone was removed in vacuo and the residue partitioned between ether and water. The ether fraction, by evaporation and crystallisation of the residue from aqueous acetone, gave the 21-iodo compound (1.53 g.) as fine needles, M.P. 129–130° (dec.), [α]$_D$+106.2° (c. 1.4 in dioxan), λ max. (in EtOH) 237–239 mμ (ε 16,480) (found: C, 55.8; H, 6.45; I, 21.1. C$_{27}$H$_{36}$FIO$_5$ requires C, 55.3; H, 6.2; I, 21.6%).

(ii) A solution of 9α-fluoro-11β-hydroxy-21-methanesulphonyloxy-16β-methyl - 17α - valeryloxypregna-1,4-diene-3,20-dione (200 mg.) in acetone (5 ml.) was treated with sodium iodide (400 mg.) and the mixture refluxed on a steam bath. After 8 days, ca. 75% conversion to 21-iodo-compound had occurred, as judged by spot intensities on thin-layer chromatography.

(d) 9α-fluoro-11β-hydroxy-16β-methyl-17α-valeryloxypregna-1,4-diene-3,20-dione

A solution of 9α-fluoro-11β-hydroxy-21-iodo-16β-methyl-17α-valeryloxyphegna-1,4-diene-3,20-dione (50 mg.) in pyridine (1.25 ml.) was heated on the steam bath for 3½ hours. The mixture was poured into water and extracted with chloroform and the isolated material (40 mg.) chromatographed on Grade IV neutral alumina to give, on elution with ether and crystallisation from benzene-petroleum, 9α-fluoro - 11β-hydroxy-16β-methyl-17α-valeryloxypregna-1,4-diene-3,20-dione (15 mg.).

EXAMPLE 3

9α-fluoro-11β-hydroxy-16β-methyl-17α-valeryloxypregna-1,4-diene-3,20-dione

A solution of 9α-fluoro-11β-hydroxy-21-methanesulphonyloxy-16β-methyl-17α - valeryloxypregna-1,4-diene-3,20-dione (500 mg.) in pyridine (12.5 ml.) was treated with sodium iodide (1 g.) and the mixture was heated on the steam bath for 6 hrs. The mixture was poured into water and the solid (383 mg.) isolated by filtration. Chloroform extraction of the filtrate afforded a further crop (30 mg.) of product. The combined solids, in acetone, were filtered through Florisil (magnesium trisilicate) to remove some of the colour and the residue, in benzene, was chromatographed on Grade IV neutral alumina (5.5 g.). Elution was ether and crystallisation of the fractions (twice) from benzene-petroleum gave 9α-fluoro-11β - hydroxy - 16β - methyl-17α-valeryloxypregna-1,4-diene-3,20-dione (171 mg.) as fine needles, M.P. 195–196°, $[\alpha]_D+64.9°$ (c. 1.3 in $CHCl_3$). Its infrared spectrum was identical with that of an authentic sample.

EXAMPLE 4

9α - fluoro-11β-hydroxy-16β-methyl-17α-valeryloxypregna-1,4-diene - 3,20 - dione from 9α-fluoro-11β-hydroxy-21-iodo-16β-methyl-17α-valeryloxypregna-1,4-diene - 3,20-dione (a) With pyridine.—A solution of 9α-fluoro-11β-hydroxy - 21 - iodo-16β-methyl-17α-valeryloxypregna-1,4-diene-3,20-dione (50 mg.) in pyridine (2 ml.) was heated on the steam bath for 3 hours. The mixture was evaporated to dryness, dissolved in chloroform and put on a small column of Grade IV neutral alumina. The column was eluted with ether and the material obtained was crystallised from chloroform-petroleum to give 9α-fluoro-11β-hydroxy-16β-methyl - 17α - valeryloxypregna-1,4-diene-3,20-dione (27 mg., 69% yield) with infrared spectrum identical to that of an authentic sample.

(b) With triethylamine.—A solution of the 21-iodo compound (50 mg.) in triethylamine (2 ml.) was heated on the steam bath for 5 hours and then worked up as in Example 4(a). Crystallisation from chloroform-petroleum gave 9α-fluoro-11β-hydroxy - 16β - methyl-17α-valeryloxypregna-1,4-diene-3,20-dione (32.7 mg., 83.5% yield) with an infrared spectrum identical to that of an authentic sample.

(c) With dimethyl sulphoxide.—A solution of the 21-iodo compound (50 mg.) in dimethylsulphoxide (2 ml.) was heated on the steam bath for 20 hours and worked up in the usual way to give an oily solid. This material was purified by preparative thin layer chromatography to give unchanged 21-iodo compound (∼ 5 mg.) and 9α - fluoro-11β-hydroxy - 16β - methyl-17α-valeryloxypregna-1,4-diene-3,20-dione (24.5 mg., 62.5% yield).

EXAMPLE 5

9α - fluoro - 11β - hydroxy - 16β - methyl-17α-valeryloxypregna-1,4-diene-3,20-dione from 21-bromo-9α-fluoro-11β - hydroxy - 16β - methyl-17α-valeryloxypregna-1,4-diene-3,20-dione (a) With sodium iodide in pyridine.—A solution of 21-bromo - 9α - fluoro-11β-hydroxy-16β-methyl-17α-valeryloxypregna-1,4-diene-3,20-dione (50 mg.) and sodium iodide (100 mg.) in pyridine (2 ml.) was heated on the steam bath for 3 hours. The pyridine was removed in vacuo and the residue, in chloroform, filtered through a small plug of Grade IV neutral alumina. The plug was washed with ether, the washings combined and evaporated to give 9α-fluoro-11β-hydroxy-16β-methyl-17α-valeryloxypregna-1,4-diene-3,20-dione (30 mg., 70%) with infrared spectrum identical to that of an authentic sample.

(b) With sodium iodide in triethylamine.—A suspension of 21-bromo-9α-fluoro-11β-hydroxy-16β-methyl-17α-valeryloxypregna-1,4-diene-3,20-dione (50 mg.) and sodium iodide (100 mg.) in triethylamine (2 ml.) was heated on the steam bath for 8 hours. The solvent was removed in vacuo and the residue treated as above to give 9α-fluoro-11β - hydroxy - 16β - methyl - 17α-valeryloxypregna-1,4-diene-3,20-dione (39.6 mg., 93%).

(c) With sodium iodide in triethylamine-acetone.—A solution of 21-bromo-9α-fluoro-11β-hydroxy-16β-methyl-17α-valeryloxypregna-1,4-diene-3,20-dione (50 mg.) and sodium iodide (100 mg.) in acetone (1.5 ml.) and triethylamine (1.5 ml.) was heated on the steam bath for 18 hours. Working up as described above gave 9α-fluoro-11β - hydroxy - 16β - methyl - 17α-valeryloxypregna-1,4-diene-3,20-dione (39.6 mg., 93%).

EXAMPLE 6

(a) 16β-methyl-17α,21(1'-ethyl-1'-ethoxymethylenedioxy)pregna-1,4,9-triene-3,20-dione A solution of 17α,21 - dihydroxy - 16β - methylpregna-1,4,9-triene-3,20-dione (500 mg.) in dioxan (20 ml.) was treated with triethyl orthopropionate (0.7 ml.) and p-toluenesulphonic acid (ca. 5 mg.). After standing at room temperature for 40 minutes the mixture was poured into dilute sodium bicarbonate and the product isolated by filtration. Crystallisation from ether gave 16β - methyl-17α,21(1'-ethyl - 1' - ethoxymethylenedioxy)pregna-1,4,9-triene-3,20-dione (340 mg.) as cubic prisms M.P. 175–177° C., $[\alpha]_D+5.2°$ (c. 1.0 dioxan), λ max. (in EtOH) 238–239 mμ (ε 16,000). (Found: C, 73.4; H, 8.5. $C_{27}H_{36}O_5$ requires C, 73.6; H, 8.25%.)

(b) 21-hydroxy-16β-methyl-17α-propionyloxypregna-1,4,9-triene-3,20-dione

Uncrystallised 16β - methyl - 17α,21(1'-ethyl-1'-ethoxymethylenedioxy)pregna - 1,4,9-triene-3,20-dione obtained from 17α,21-hydroxy-16β-methylpregna-1,4,9-triene-3,20-dione (8.0 g.) as described in Example 6(a) was dissolved in acetic acid (95 ml.) containing water (8 ml.) and kept at room temperature for 40 minutes. Dilution with water and filtration gave the crude product. Crystallisation of this material from ether (containing a little acetone)—petroleum gave 21-hydroxy - 16β - methyl-17α-propionyloxypregna-1,4,9-triene-3,20-dione (7.52 g.) as large prisms, M.P. 177–179° C., $[\alpha]_D+16.1°$ (c. 0.9 dioxan), λ max. (in EtOH) 237–238 mμ (ε 16,210). (Found: C, 73.0; H, 7.9. $C_{25}H_{32}O_5$ requires C, 72.8; H, 7.8%.)

(c) 16β-methyl-17α-propionyloxypregna-1,4,9-triene-3,20-dione

A solution of 21-hydroxy-16β-methyl-17α-propionyloxypregna-1,4,9-triene-3,20-dione (6.7 g.) in dry pyridine (50 ml.) was treated, at 0°, with methanesulphonyl chloride (1.87 ml.). After standing at room temperature for 1 hour the mixture was poured with stirring into iced N-hydrochloric acid. Filtration gave the 21-methanesulphonate (7.9 g., 99%) as a white amorphous solid.

The methanesulphonate (7 g.) in pyridine (200 ml.) was treated with sodium iodide (14 g.) and the mixture was heated on the steam bath for 5 hours. The pyridine was removed in vacuo and the dark oily residue was dissolved in chloroform and filtered through silica gel. The silica gel was washed with ether and the washings evaporated to give a pale yellow crystalline solid. Crystallisation of this material from ether, then from ether-petroleum, gave 16β-methyl-17α-propionyloxypregna-1,4,9-triene - 3,20 - dione (2.88 g.) as silky needles, M.P. 177–179° C., $[\alpha]_D+2.7°$ (c. 1.1 dioxan), λ max. (in EtOH) 237–238 mμ (ε 15,580). (Found: C, 75.75; H, 8.1. $C_{25}H_{32}O_4$ requires C, 75.7; H, 8.15%.)

EXAMPLE 7

(a) 9α-fluoro - 11β,21 - dihydroxy-16α-methyl-17-propionyloxypregna-1,4-diene-3,20-dione (dexamethasone 17-propionate)

Dexamethasone (5 g.) was dissolved in dioxan (200 ml.) and p-toluenesulphonic acid (400 mg.) and triethyl orthopropionate (20 ml.) were added. The solution was allowed to stand at room temperature for 1 hr. and was then poured into sodium bicarbonate solution. The white solid was filtered off and dried at 100° C. to give dexamethasone 17,21-ethyl orthopropionate (5.83 g.).

This material was dissolved in acetone (240 ml.) and water (48 ml.) and 2 N sulphuric acid (2.4 ml.) were added. The solution was allowed to stand at room temperature for 30 min. and was then poured into water; the product was isolated with chloroform. The crude solid was crystallised from acetone-hexane to give 9α-fluoro-11β,21-dihydroxy - 16α - methyl-17-propionyloxypregna-1,4-diene-3,20-dione (3.6 g.), M.P. 219–223° C., $[\alpha]_D$ –6° (c. 1.0 in $CHCl_3$); $\lambda_{max.}$ 238 mμ ($E_1^{1\%}$ cm. 351). (Found: C, 67.25; H, 7.0. $C_{25}H_{33}FO_6$ requires C, 67.0; H, 7.4%.)

(b) 9α-fluoro-11β-hydroxy - 21 - methanesulphonyloxy-16α - methyl - 17 - propionyloxypregna - 1,4 - diene-3,20-dione Dexamethasone 17-propionate (3 g.) was dissolved in pyridine (30 ml.) and the solution was cooled to −10° C. Methanesulphonyl chloride (3 ml.) was added and the temperature was kept at about 20° for 30 minutes. The reaction mixture was poured into cold dilute 2 N hydrochloric acid and the white solid was filtered off and dried (3.3 g.). It was then crystallised from acetone-hexane to give the methanesulphonate (2.9 g.); M.P. 183–186° C. (decomp.); $[\alpha]_D$+46° (c. 1.0 in $CHCl_3$); $\lambda_{max.}$ 238 mμ ($E_1^{1\%}$ cm. 308). (Found: C, 59.6; H, 6.5; S, 6.1. $C_{26}H_{35}FO_8S$ requires C, 59.3; H, 6.7; S, 6.1%.)

(c) 9α - fluoro - 11β - hydroxy - 16α - methyl - 17 - propionyloxypregna - 1,4 - diene - 3,20 - dione (21-deoxydexamethasone 17-propionate)

9α - fluoro - 11β - hydroxy - 21 - methanesulphonyloxy-16α-methyl-17-propionyloxypregna-1,4-diene-3,20 - dione (500 mg.) was dissolved in pyridine (25 ml.) and sodium iodide (2.5 g.) was added. The solution was heated in an oil bath maintained at 105° C. for 17 hrs. and was then cooled and poured into cold 2 N hydrochloric acid and extracted with chloroform. The extract was washed with water, sodium thiosulphate solution and water and was dried ($MgSO_4$). The solution was then evaporated and the residue was crystallised from acetone-hexane to give 21-deoxydexamethasone 17-propionate (140 mg.); M.P. 216–219°; $[\alpha]_D$+50° (c. 1 in $CHCl_3$); $\lambda_{max.}$ 239 mμ ($E_1^{1\%}$ cm. 367). (Found: C, 69.4, H, 7.5. $C_{25}H_{33}FO_5$ requires C, 69.3; H, 7.7%.)

I claim:

1. A process for the preparation of a 21-unsubstituted-17α-acyloxy steroid of the pregnane series having at position 17 the formula:

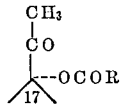

which comprises heating a 21-substituted-17α-acyloxy steroid of the pregnane series having at the position 17 the formula:

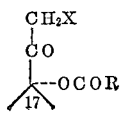

wherein X is a member of the group consisting of bromine, hydrocarbonsulfonyloxy and iodine and R, in each instance, is an alkyl, cycloalkyl, cycloalkylalkyl or aralkyl group, with a member of the group consisting of a tertiary amine and a dialkylsulfoxide and, when X is bromine and hydrocarbonsulfonyloxy, in the presence of a metal iodide.

2. A process as claimed in claim 1 wherein the 21-substituted steroid is heated with pyridine.

3. A process as claimed in claim 1 wherein the 21-substituted steroid is heated with a trialkylamine.

4. A process as claimed in claim 3 wherein the trialkylamine is triethylamine.

5. A process as claimed in claim 1 wherein the 21-substituted steroid is heated with dimethylsulfoxide.

6. A process as claimed in claim 1 wherein the 21-substituted steroid is heated in the presence of an inert solvent selected from the group consisting of acetone, methylethyl ketone, methanol, ethanol, isopropanol and dimethylformamide.

7. A process as claimed in claim 1 wherein the reaction is conducted at a temperature of from 60° C. to 120° C.

8. A process as claimed in claim 1 wherein the metal iodide is a member of the group consisting of alkali metal iodides and alkaline earth metal iodides.

9. A process as claimed in claim 1 wherein X is a hydrocarbon sulfonyloxy group which contains an alkyl group having from 1 to 6 carbon atoms.

10. A process as claimed in claim 9 wherein X is a hydrocarbon sulfonyloxy group which contains a phenyl group.

11. A process as claimed in claim 1 wherein a starting steroid in which X is iodine is heated with a member of the group consisting of pyridine, triethylamine and dimethylsulfoxide at a temperature from 60° C. to 120° C.

12. A process as claimed in claim 1 wherein a starting steroid in which X is bromine is heated with a member of the group consisting of pyridine, triethylamine and dimethylsulfoxide at a temperature from 60° C. to 120° C.

13. A process as claimed in claim 12 wherein the metal iodide is a member of the group consisting of alkali-metal iodides and alkaline earth metal iodides.

14. A process as claimed in claim 1 wherein a starting steroid in which X is hydrocarbonsulfonyloxy is heated with a member of the group consisting of pyridine, triethylamine and dimethylsulfoxide at a temperature from 60° C. to 120° C.

15. A process as claimed in claim 14 wherein the metal iodide is a member of the group consisting of alkali-metal iodides and alkaline earth metal iodides.

16. A process as claimed in claim 11 wherein the starting steroid is a 17-acyloxy ester of 9α-fluoro-11β,17α-dihydroxy-16-methyl-21-iodo-pregna - 1,4 - diene - 3,20-dione.

17. A process as claimed in claim 12 wherein the starting steroid is a 17-acyloxy ester of 9α-fluoro-11β,17α-dihydroxy - 16 - methyl - 21 - bromo - pregna - 1,4 - diene-3,20-dione.

18. A process as claimed in claim 14 wherein the starting steroid is a 17-acyloxy ester of 9α-fluoro-11β,17α-dihydroxy - 16 - methyl - 21 - hydrocarbonsulfonyloxypregna-1,4-diene-3,20-dione.

References Cited

UNITED STATES PATENTS 3,251,834   5/1966   Martin et al. _____ 260—239.55
3,282,929   11/1966  Heller et al. _____ 260—239.55

ELBERT L. ROBERTS, *Primary Examiner.*

U.S. Cl. X.R.

260—239.55